United States Patent [19]

Cielaszyk

[11] 3,930,362

[45] Jan. 6, 1976

[54] MEANS FOR DEVELOPING FRICTION IN CLOCK SETTING SHAFT

[75] Inventor: Edward F. Cielaszyk, Oglesby, Ill.

[73] Assignee: General Time Corporation, Mesa, Ariz.

[22] Filed: Mar. 12, 1975

[21] Appl. No.: 557,474

[52] U.S. Cl. .................................. 58/85.5; 64/30 D

[51] Int. Cl.[2] ...................... G04B 27/00; F16D 7/02

[58] Field of Search ................ 58/63, 85.5; 64/30 D

[56] References Cited

UNITED STATES PATENTS

| | | | |
|---|---|---|---|
| 2,814,188 | 11/1957 | Fox | 58/63 X |
| 3,443,375 | 5/1969 | Cielaszyk | 58/85.5 |
| 3,487,633 | 11/1970 | Wuthrich | 58/63 |
| 3,548,587 | 12/1970 | Wood | 58/85.5 X |

*Primary Examiner*—George H. Miller, Jr.
*Attorney, Agent, or Firm*—Wolfe, Hubbard, Leydig, Voit & Osann, Ltd.

[57] ABSTRACT

A clock "friction" for use in clocks having plastic gear wheels which permits manual setting of the hands but in which a reliable level of frictional torque is obtained without requiring use of any auxiliary parts. The centerwheel of the clock has an interference fit with respect to the center, or minute hand, shaft upon which it is telescoped, and the minute hand shaft is formed with an annular groove lying generally in the plane of the centerwheel into which the plastic relaxes and flows for maintaining the centerwheel in a desired axial position. The minute hand shaft has a setting knob, and means are provided for precluding axial shifting of the center shaft, by pushing or pulling, which might result in stripping of the plastic in the groove.

9 Claims, 5 Drawing Figures

MEANS FOR DEVELOPING FRICTION IN CLOCK SETTING SHAFT

In my earlier U.S. Pat. No. 3,443,375 which issued May 13, 1969 there is disclosed a friction mechanism for a clock which includes segmental jaws on the centerwheel encircled by an auxiliary garter spring serving to press the jaws into a registering tapered section on the shaft to provide friction while maintaining the centerwheel in its desired axial position.

It is an object of the present invention to improve upon, and simplify, the earlier construction in terms of both effectiveness and cost.

It is therefore an object of the invention to provide a clock friction for establishing frictional driving torque between the drive train and clock hands which has reliable and consistent torque characteristics over the life of the clock and which is capable of achieving the desired result without added elements such as the jaws or garter springs previously required. It is a more specific object of the invention to provide a friction connection resulting in a friction torque which is maintained at a reliable level over a long period of time, which is constant from clock to clock in quantity production, and which is obtainable, with ease of assembly, at minimum cost. It is a related object to provide a friction connection between the centerwheel and minute hand shaft of a clock in which the operating position of the centerwheel on the shaft is automatically established and in which there is no possibility of axial dislodgement of the centerwheel with respect to the shaft.

It is another object to provide a clock friction which utilizes, for frictional and retention purposes, characteristics which are inherent in a conventionally employed plastic centerwheel but which have not been heretofore taken advantage of. More specifically it is an object to provide a friction in which the restoring force developed in an outwardly stressed centerwheel is utilized for causing an annular ridge of plastic to relax and flow into permanent position in a mating annular groove provided in the minute hand shaft.

Other objects and advantages of the invention will become apparent upon reading the attached detailed description and upon reference to the drawings in which.

Figures 1, 2, 3, 4, 5:
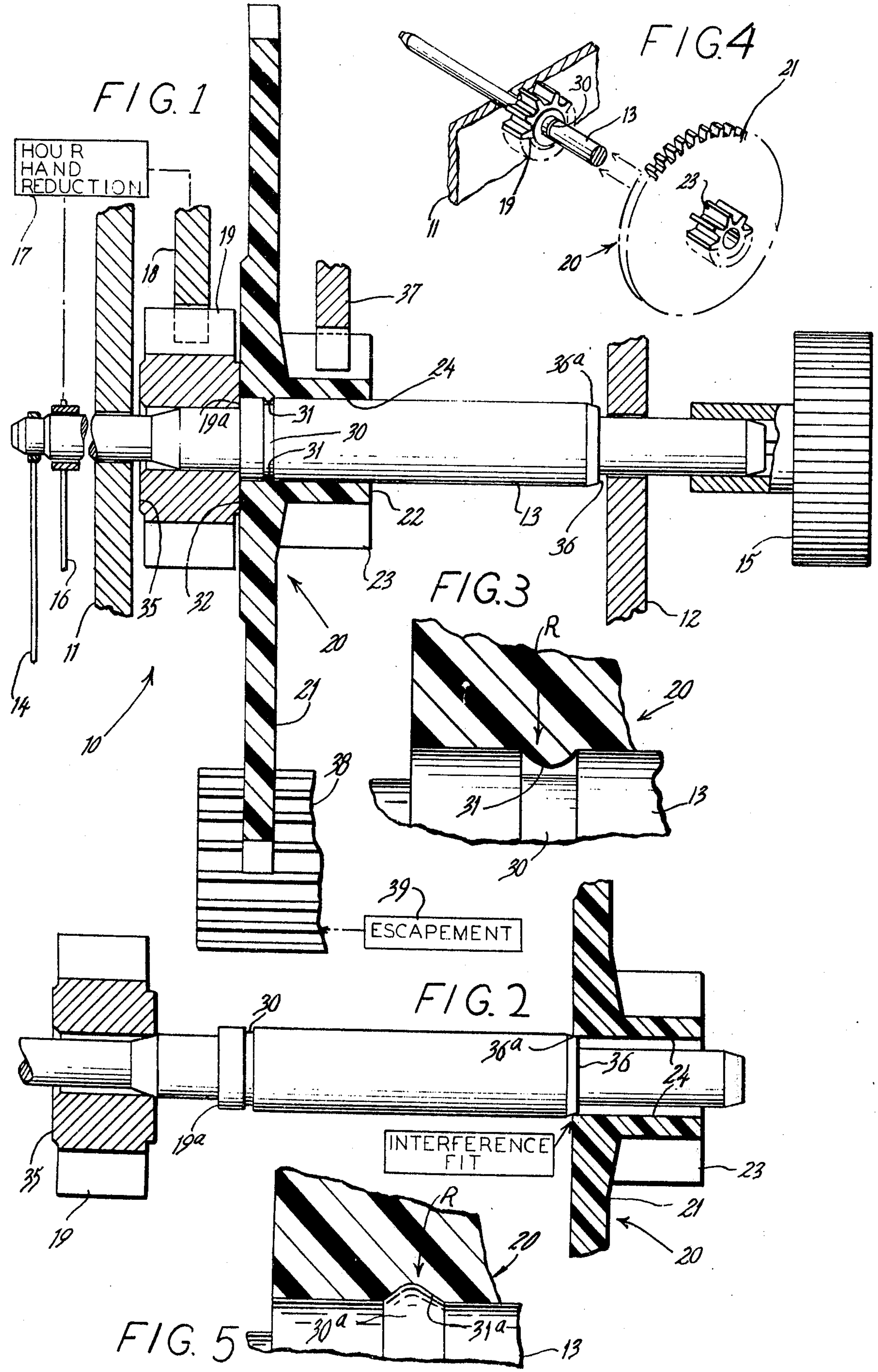
FIG. 1 shows, in vertical section, a centerwheel and associated center, or minute hand, shaft constructed in accordance with the present invention and with the frame plates of the mechanism, and associated gear wheels and pinions, being indicated fragmentarily.
FIG. 2 is a fragmentary view showing the interfering fit between the centerwheel and the minute hand shaft with the centerwheel in the act of being telescoped over the shaft.
FIG. 3 is an enlarged fragmentary view showing the relaxing and flowing of the plastic into a registering groove on the shaft.
FIG. 4 is a fragmentary perspective view of the wheel and shaft.

FIG. 5, similar to FIG. 3, shows an alternative construction.

While the invention has been described in connection with a preferred embodiment, it will be understood that I do not intend to limit the invention to such embodiment but intend on the contrary to cover the various alternative and equivalent forms of the invention included within the spirit and scope of the appended claims.

Turning now to FIG. 1 there is shown a clock mechanism 10 having a frame which includes a pair of spaced, parallel frame plates 11, 12.

For the details of a typical clock mechanism to which the invention is applicable including source of driving torque, timing train and escapement, reference is made to my prior patent. It will suffice for present purposes to say that a center or minute hand shaft 13 is journaled in alined openings in the frame plates carrying a minute hand 14 at one end and having a setting knob 15 at the other. The minute hand has a cooperating hour hand 16 which is coupled to the minute hand via an hour hand reduction 17 including an hour hand gear 18 which is driven by a pinion 19. For frictionally driving the minute hand shaft 13, a unitary centerwheel member 20 is provided which is molded of plastic and which includes a centerwheel 21 and hub 22 with pinion 23 molded on the hub. The hub provides an extensive cylindrical inner surface 24 embracing the shaft.

In accordance with the present invention the centerwheel member is made of durable plastic having stable characteristics and a relatively high modulus of elasticity, with the cylindrical inner surface 24 having a diameter which is slightly less than the diameter of the shaft 13 over which it is telescoped so as to obtain an interfering fit to develop in the plastic of the wheel 21 and hub 22 a restoring force at a level which is sufficiently high as to insure development of a reliable frictional driving torque between the centerwheel assembly and the shaft. More specifically in accordance with the invention the shaft is provided with a narrow annular groove 30 which lies substantially in the plane of the centerwheel 21 when the centerwheel is in its operating position so that the restoring force developed in the wheel by the interfering fit causes the plastic to relax and to some extent flow into the groove 30 to form an internal ridge 31. This provides a registering axial connection, as illustrated in enlarged form in FIG. 3, tending thereafter to maintain the centerwheel member accurately in its working position over the life of the clock.

It is one of the further features of the invention that a shoulder is provided on the shaft 13, against which the centerwheel member is seated during the course of telescoping assembly and which defines the working position of the member which working position is maintained by the registered condition of the groove 30 and the internal plastic ridge 31. The shoulder, against which the centerwheel is seated, and which is indicated at 32, it preferably formed by the side wall of hour hand reduction pinion 19 which is tightly mounted in fixed position adjacent the front or left-hand end of the center shaft 13.

In accordance with a still further feature of the present invention, means are provided for insuring that the shaft 13 is securely anchored with respect to the frame plates and cannot by axially dislodged with respect to the centerwheel assembly 20. This is accomplished by providing shoulders on the shaft 13 to prevent movement in the respective directions. The first shoulder, indicated at 35, is formed by the presented surface of th pinion 19 and abuts the frame plate 11 to preclude movement in that direction. The second shoulder, indicated at 36, is formed directly upon the shaft 13 and faces the frame plate 12 to preclude movement in the opposite direction. Consequently, the setting knob 15 is completely blocked against axial movement; it can be neither pushed nor pulled, and thus there is no possibility that force can be applied via the shaft which would have the effect of shearing off the plastic ridge 31 thereby destroying the condition of axial register between the centerwheel assembly 20 and the shaft.

To complete the assembly, means are, in a mechanical clock, provided for driving the pinion 23. As set forth in my prior patent, such means may be in the form of a gear 37 mounted upon the spring barrel. The periphery of the center gear 21 engages a pinion 38 which forms an element of the timing train leading to an escapement 39.

It will thus be apparent that under normal driving conditions timed rotation of the pinion 38 drives the centerwheel 121, with the center shaft being rotated in unison therewith through the friction connection, for timed rotation of the minute hand and hour hand.

Assembly of the elements 19, 20 on the center shaft is a simple matter as illustrated in FIG. 2. The output pinion 19, which has a severe interfering fit with respect to the shaft 13, is first pressed into fixed, rigid position against a shallow shoulder 19*a.* Following this the centerwheel member 20 is forcibly telescoped over the shaft 13. For guidance purposes, and to overcome the interference, the shaft may be provided with a short tapered section 36*a* adjacent the shoulder 36. Alternatively, the leading edge of the bore 24 may be provided with a short flare along the left-hand edge thereof as viewed in FIG. 1. In any event the sliding friction is overcome, with the centerwheel member being moved with a single motion into its working position bottomed against the surface 32 on the pinion 19. With the member 20 in working position, relaxation and flow of the plastic occurs under the influence of the inwardly directed restoring force, indicated at R, resulting in the formation of the internal ridge 31 which remains permanently in register with the groove 30. Any possibility of shearing off the ridge is prevented since pushing or pulling of the setting knob 15 simply results in prompt bottoming of the shoulders 35, 36 on the shaft against the respective frame plates so that no endwise force is applied to the member 20.

As stated, it is one of the features of the construction that the groove 30, when the centerwheel is in working position, is located so that the groove lies substantially in the plane of the centerwheel. This takes advantage of the fact that most of the restoring force is developed in the plane of the wheel so that inward flow of plastic into the groove occurs reliably and to a greater extent than if the groove were located opposite the projecting hub portion where the plastic is of reduced cross section.

The invention is not limited to use of any single plastic material. It is preferred, however, that a durable plastic be employed having a modulus of elasticity of 400,000 psi and which is capable upon being stressed, of minor flow into a "set" condition. It is also desirable that the plastic be chemically stable and capable of retaining its characteristics undiminished over a long period of time. One example of a plastic meeting these conditions is the material commonly available from the DuPont Corporation having a catalog designation Delrin 8010. Using a material of this kind adequate reaction force to achieve the desired friction and desired flow and retention may be developed employing interference between the shaft and inner diameter of hub on the order of 0.001 inch.

It will be apparent that the objects of the invention have been amply carried out. A reliable level of friction is simply achieved, combined with accurate and permanent retention, without any additional mechanical parts whatsoever and with a consequent high degree of economy in piece part cost and in the assembly of the parts, on a production line basis, into a working unit.

While the above constitutes the preferred form of the invention, the invention in its broader aspects may be practiced using other narrow, annular locator means interposed between the shaft and the hub and which inhibits relative endwise movement so that the centerwheel "tracks" in a permanent position on the shaft over the life of the clock and in spite of relative setting motion. Thus as set forth in FIG. 5 the centerwheel may be the grooved element and the bead or ridge, cooperating therewith, may be formed on the shaft. Thus there is provided, on the shaft 13, a shallow annular bead or ridge 30*a* which, when the centerwheel is moved into seated position against the shoulder 32, deforms the plastic in the region into a registering annular groove 31*a.* Since the shaft 13 is blocked against axial movement, as previously described, no force can be set up between the shaft and the centerwheel member capable of dislodging the latter so that the groove 31*a,* formed in part by flow of the plastic under stress, results in permanent tracking. In the case of the embodiment illustrated in FIG. 5 friction is produced in the groove and consequently the bead or ridge diameter may be considered the maximum diameter of the shaft for interference fit purposes.

In the preferred construction the pinion 19 on the shaft 13 presents a shoulder 32 surrounding the shaft, which serves as an axial "locator" for the center wheel. However, in many designs of clocks the hour hand reduction, including the pinion 19, lies entirely outboard of the adjacent frame plate 11; in other words, the pinion 19 is mounted at the outer, or left-hand, side of the frame plate while the frame plate is moved relatively inwardly to the location of the shoulder surface 32 (with the hole in the frame plate being enlarged appropriately for clearance purposes). In such event the land surrounding the hole serves as a "shoulder" to perform the locator function.

What I claim is:

1. In a clock having minute and hour hands with interposed gear reduction, the combination comprising a timed driving train having a centerwheel and source of driving torque, a minute hand shaft telescoped through the centerwheel, said centerwheel being formed of molded plastic and having a hub providing an extensive cylindrical inner surface in contact with the shaft, the diameter of the inner surface, prior to telescoping, being slightly less than the diameter of the shaft so that friction torque is developed between the shaft and the wheel for normal driving of the shaft but with the shaft being forcibly rotatable to overcome the friction torque for setting of the hands, the shaft having an annular groove extending over a minor portion of the length of the hub and into which the plastic relaxes and flows after the centerwheel is located in a desired axial position thereby to maintain the centerwheel in such axial position.

2. The combination as claimed in claim 1 in which the centerwheel and hub are molded integrally so that when the shaft is telescoped into the centerwheel an inwardly directed restoring force is created in the centerwheel, the groove in the shaft being in substantial planar alinement with the centerwheel so that the restoring force tends to crowd some of the plastic of the hub into the groove.

3. In a clock having minute and hour hands with interposed gear reduction, the combination comprising a timed driving train having a centerwheel and source of driving torque, a minute hand shaft telescoped through the centerwheel, said centerwheel being formed of molded plastic and having a hub providing an extensive cylindrical inner surface in contact with the shaft, the diameter of the inner surface, prior to telescoping, being slightly less than the diameter of the shaft so that friction torque is developed between the shaft and the wheel for normal driving of the shaft but with the shaft being forcibly rotatable to overcome the friction torque for setting of the hands, an annular shoulder surrounding the shaft, the shaft having a narrow annular groove spaced a short distance from the shoulder and generally alined with the centerwheel when the centerwheel is telescoped into operating position against the shoulder, in which position the plastic adjacent the groove, forced inwardly by the restoring force of the plastic in the wheel, flows into the groove to form an internal ridge registering with the groove thereby to maintain the centerwheel in its operating position adjacent the shoulder.

4. The combination as claimed in claim 3 in which the shoulder is in the form of a pinion tightly telescoped over the shaft in fixed position, the pinion forming an element of the gear reduction between the minute and hour hands.

5. In a clock having minute and hour hands, the combination comprising a pair of spaced frame plates, a minute hand shaft journaled in the frame plates, the minute hand shaft carrying the minute hand at one end and having a manually accessible setting knob at the other end, a timed driving train having a centerwheel and source of driving torque, the centerwheel being telescoped over the minute hand shaft into a working position between the frame plates, said centerwheel being formed of molded plastic and having an integral hub providing an extensive cylindrical inner surface in contact with the shaft, the minimum diameter of the inner surface, prior to telescoping, being slightly less than the diameter of the shaft so that friction torque is developed between the shaft and the wheel for normal driving of the shaft, but with the shaft being forcibly rotatable by the setting knob to overcome the friction torque for setting of the hands, the shaft having an annular groove extending over a minor portion of the length of the hub and into which the plastic relaxes and flows after the centerwheel is located in its desired axial working position thereby to maintain the centerwheel in such axial position during the life of the clock, and means for blocking the minute hand shaft against axial movement in either direction with respect to the frame plates, thereby precluding dislodgement of the centerwheel by shearing of the plastic in the groove upon either pulling or pushing upon the setting knob.

6. The combination as claimed in claim 5 in which the means for blocking the minute hand shaft against axial movement is in the form of outwardly facing shoulders on the shaft.

7. In a clock having minute and hour hands with interposed gear reduction, the combination comprising a timed driving train having a centerwheel and source of driving torque, a minute hand shaft telescoped through the centerwheel, said centerwheel being formed of molded plastic and having an integral hub providing a cylindrical inner surface in contact with the shaft, the diameter of the inner surface, prior to telescoping, being slightly less than the maximum diameter of the shaft so that friction torque is developed between the shaft and the wheel for normal driving of the shaft but with the shaft being forcibly rotatable to overcome the friction torque for setting of the hands, means defining an annular shoulder surrounding the shaft, the shaft being formed to define with the centerwheel, as a result of flow of the plastic of the centerwheel, a narrow annular ridge-and-groove engagement spaced a short distance from the shoulder and generally alined with the centerwheel when the centerwheel is telescoped into operating position against the shoulder, the ridge-and-groove engagement serving to key the parts against relative axial movement as the shaft is forcibly rotated for setting purposes thereby to maintain the centerwheel in its operating position adjacent the shoulder.

8. The combination as claimed in claim 7 in which the shaft has a shallow annular bead forming a ridge thereon and in which the mating groove is formed by the flow of the plastic in the plastic centerwheel in accommodation of the bead.

9. In a clock having minute and hour hands with interposed gear reduction the combination comprising a pair of spaced frame plates, a minute hand shaft journaled in the frame plates, the minute hand shaft carrying the minute hand at one end and having a manually accessible setting knob at the other end, a timed driving train having a centerwheel and source of driving torque, the centerwheel being telescoped over the minute hand shaft into a working position between the frame plates, said centerwheel being formed of molded plastic and having an integral hub providing an inner surface in contact with the shaft, the diameter of the inner surface, prior to telescoping, being slightly less than the maximum diameter of the shaft so that friction troque is developed between the shaft and the wheel for normal driving of the shaft but with the shaft being forcibly rotatable by the setting knob to overcome the friction torque for setting of the hands, the shaft having a shoulder which abuts the centerwheel and against which the wheel is bottomed incident to assembly to define the working position of the centerwheel, the shaft further having an annular locating means cooperating with the hub for inhibiting axial movement of the centerwheel away from its working position, and means for blocking the minute hand shaft against axial movement in either direction with respect to the frame plates, thereby precluding dislodgement of the centerwheel with respect to the shaft upon either pulling or pushing upon the setting knob.

* * * * *